United States Patent
Lee

(10) Patent No.: US 9,261,889 B1
(45) Date of Patent: Feb. 16, 2016

(54) METHOD FOR CONTROLLING THE SYSTEM POWER AND ELECTRONIC DEVICE FOR CONTROLLING THE SYSTEM POWER

(71) Applicant: GETAC TECHNOLOGY CORPORATION, Hsinchu County (TW)

(72) Inventor: Ping-Wei Lee, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 0 days.

(21) Appl. No.: 14/527,675

(22) Filed: Oct. 29, 2014

(51) Int. Cl.
  *G05F 1/10* (2006.01)
  *G01K 13/00* (2006.01)
  *G06F 1/20* (2006.01)

(52) U.S. Cl.
  CPC ........ *G05F 1/10* (2013.01); *G01K 13/00* (2013.01); *G06F 1/206* (2013.01)

(58) Field of Classification Search
  CPC ........... G05F 1/10; G01K 13/00; G06K 1/206
  See application file for complete search history.

(56) References Cited

U.S. PATENT DOCUMENTS

| | | | | |
|---|---|---|---|---|
| 5,512,733 A | * | 4/1996 | Takikawa | H05B 6/1227 219/620 |
| 2010/0157530 A1 | * | 6/2010 | Li | G06F 1/1616 361/694 |
| 2014/0121852 A1 | * | 5/2014 | Peng | F28F 13/14 700/299 |

* cited by examiner

*Primary Examiner* — Jung Kim

(57) ABSTRACT

A method for controlling the system power is applied in an electronic device. The method includes detecting a sensing temperature of a system-on chip of the electronic device, comparing the sensing temperature with a presetting temperature, capturing a detected signal produced by a gravity sensor of the electronic device when determining the sensing temperature is greater than the presetting temperature, and lowering the surface temperature of the electronic device by setting the power limitation of the system-on chip to be a first preset power corresponded to a first setting status when the detected signal indicates that the electronic device is in the first setting status.

20 Claims, 7 Drawing Sheets

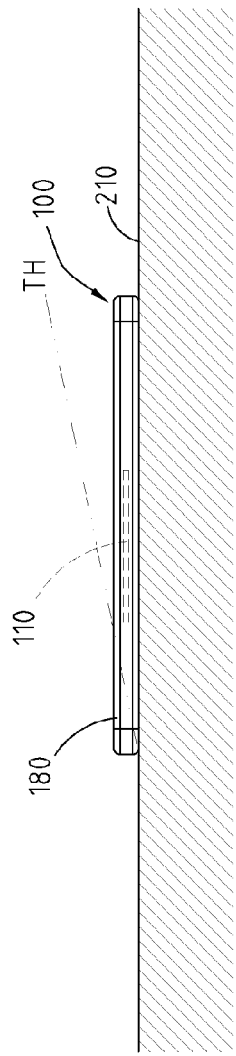
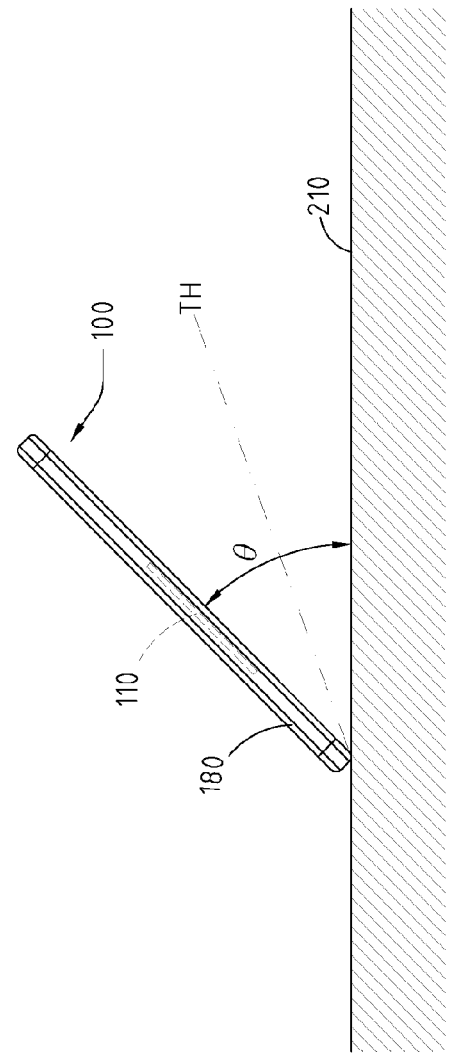

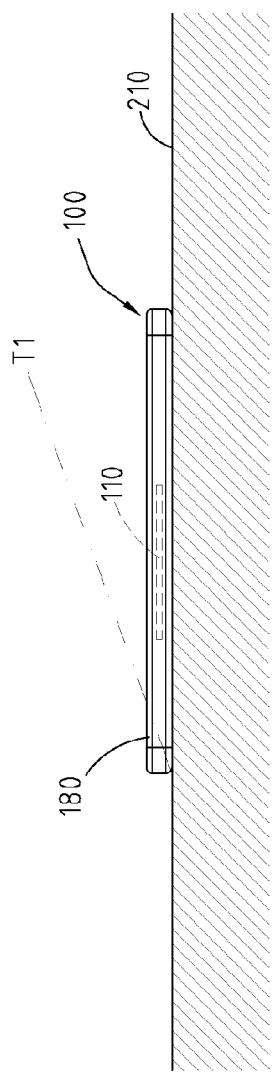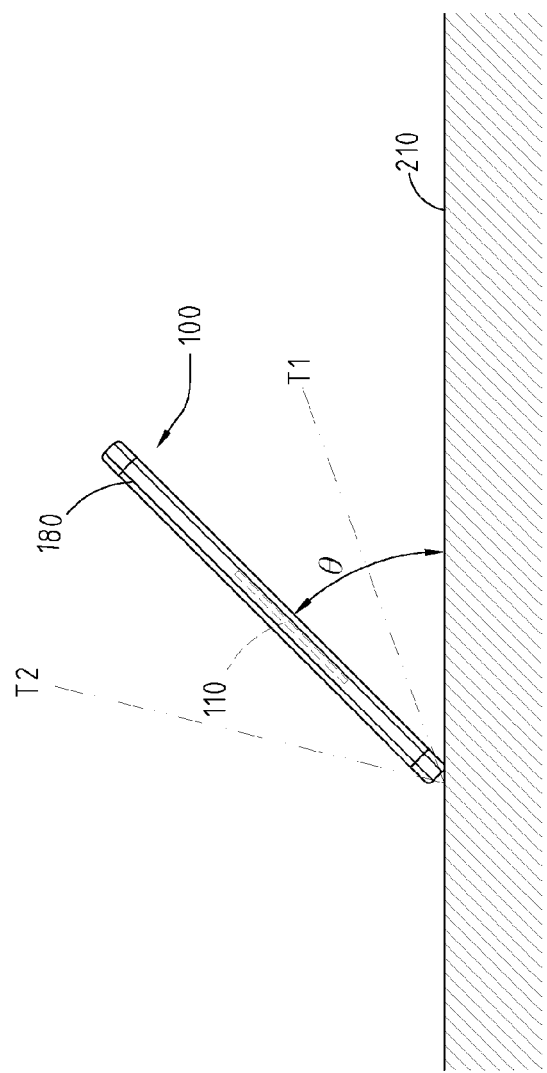

METHOD FOR CONTROLLING THE SYSTEM POWER AND ELECTRONIC DEVICE FOR CONTROLLING THE SYSTEM POWER

BACKGROUND OF THE INVENTION

1. Field of the Invention

The present invention relates to an electronic device, particularly to a method for controlling the system power and an electronic device for controlling the system power.

2. Description of the Prior Art

In recent years, with advances in technology, electronic devices are designed toward light weight, small size, and easy to carry. Among the portable electronic devices, such as notebooks (NB) or tablet PCs, they allow the user to be no longer limited by the bulky desktop computer because of the aforesaid characteristics and can be carried outside of the office with the use of various functions in the electronic device. Therefore, the users of the portable electronic device are growing increasingly.

The portable electronic devices are usually placed on the desktop. However, since the portable electronic device is in contact with the desktop, the heat dissipation area of the portable electronic device is reduced. Therefore, it is increasingly likely to cause the surface temperature of the portable electronic device increase easily, probably causing the portable electronic device to crash due to high temperature or reduces the life of electronic components.

SUMMARY OF THE INVENTION

It is an objective of the present invention to provide a method for controlling the system power, which is applicable to an electronic device, such that the power of the electronic device can be adjusted in accordance with a different setting status.

To achieve the objective above, the method for controlling the system power includes detecting a sensing temperature of a system-on chip (SoC) of an electronic device; comparing the sensing temperature and a preset temperature; capturing a detected signal produced by a gravity sensor of the electronic device when determining the sensing temperature is greater than the preset temperature; and lowering the surface temperature of the electronic device by setting the power limitation of the system-on chip to be a first preset power corresponding to a first setting status when the detected signal indicates that the electronic device is in the first setting status.

It is another objective of the present invention to disclose an electronic device for controlling the system power, such that the power of the electronic device can be adjusted in accordance with a different setting status.

To achieve the objective described above, the electronic device for controlling the system power includes a system-on chip (SoC), a temperature sensor, a comparing unit, a determining unit, and a power adjustment unit. The system-on chip is disposed within a shell of the electronic device. The temperature sensor is used to detect a sensing temperature of the system-on chip. The comparing unit is used to compare the sensing temperature and a preset temperature. The determining unit is used to capture a detected signal produced by a gravity sensor of the electronic device when determining the sensing temperature is greater than the preset temperature. The power adjustment unit is used to lower the surface temperature of the electronic device by setting the power limitation of the system-on chip to be a first preset power corresponding to a first setting status when the sensing temperature is greater than the preset temperature and the detected signal indicates that the electronic device is in the first setting status.

As described above, the method for controlling the system power and the electronic device for controlling the system power according to the present invention detects the current setting status of the electronic device through a gravity sensor (G-Sensor) of the electronic device, such that the electronic device can enable the power limitation of the system-on chip to correspond to a specific preset power with a different setting status according to a detected signal produced by the gravity sensor. Thus, the output power of the electronic device can be most effectively used with a different setting status, and the surface temperature of the electronic device can be stably maintained within a specific range.

Hereinafter, the detailed features and merits of the present invention will be described in detail with reference to embodiments. The technical content of the present invention is obvious to those skilled in the art and can be implemented accordingly. Also, the objectives and advantages related to the present invention can be easily understood by those skilled in the art in accordance with the content, claims, and drawings disclosed in the present specification.

BRIEF DESCRIPTION OF THE DRAWINGS

FIG. 4 is a lateral view showing the electronic device for controlling the system power in a first setting status according to the first embodiment of the present invention;

FIG. 5 is a lateral view showing the electronic device for controlling the system power in a second setting status according to the first embodiment of the present invention;

FIG. 7 is a lateral view showing the electronic device for controlling the system power in the first setting status according to the second embodiment of the present invention;

FIG. 8 is a lateral view showing the electronic device for controlling the system power in the third setting status according to the second embodiment of the present invention.

DETAILED DESCRIPTION OF THE EMBODIMENTS

Figure 1:
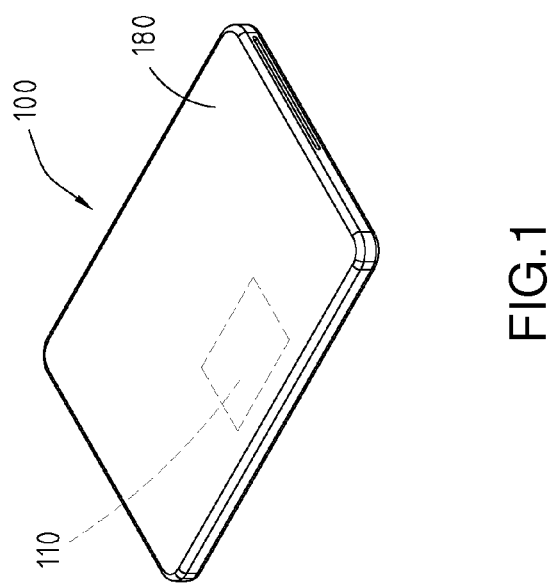
FIG. 1 is a view showing the appearance of an electronic device for controlling the system power according to a first embodiment of the present invention.
Figure 2:
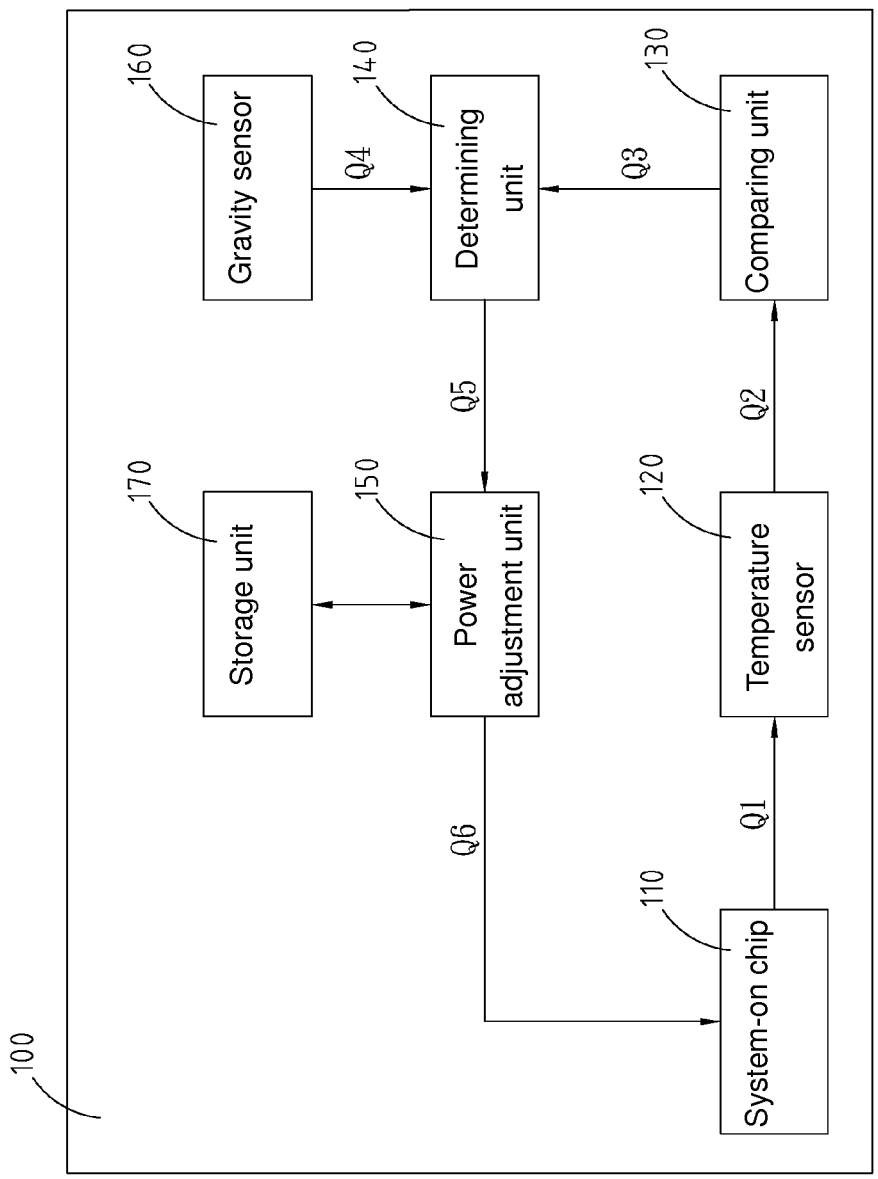
FIG. 2 is a circuit block diagram of an electronic device for controlling the system power according to the first embodiment of the present invention.

FIG. 1 illustrates the appearance of an electronic device for controlling the system power according to a first embodiment of the present invention. FIG. 2 is a circuit block diagram of an electronic device for controlling the system power according to the first embodiment of the present invention. Please refer to FIG. 1 and FIG. 2. The electronic device 100 for controlling the system power includes a system-on chip (SoC) 110, a temperature sensor 120, a comparing unit 130, a determining unit 140, and a power adjustment unit 150. The system-on chip 110, temperature sensor 120, comparing unit 130, determining unit 140, and power adjustment unit 150 are disposed within a shell 180 of the electronic device 100. In some embodiments, the electronic device 100 for controlling the system power is a portable electronic device, such as notebook computers, tablet computers, personal digital assistants, and so on but the present invention is not limited thereto.

The temperature sensor 120 can receive a temperature signal Q1 from the system-on chip 110. The comparing unit 130 can receive a sensing signal Q2 from the temperature sensor 120. Two input terminals of the determining unit 140 are electrically connected to an output terminal of the comparing unit 130 and an output terminal of the gravity sensor 160 respectively, and used to receive a comparison result Q3 from the comparing unit 130 and a detected signal Q4 from the gravity sensor 160. The power adjustment unit 150 can receive a determination result Q5 from the determining unit 140. The system-on chip 110 is used to receive an adjusting signal Q6 from the power adjustment unit 150.

The temperature sensor 120 is used to detect a sensing temperature of the system-on chip 110. The comparing unit 130 is used to compare the sensing temperature of the temperature sensor 120 with the preset temperature of the electronic device 100, and output the comparison result Q3 to the determining unit 140. When the comparison result Q3 indicates that the sensing temperature is greater than the preset temperature, the determining unit 140 captures the detected signal Q4 produced by the gravity sensor 160, and determines the current setting status of the electronic device 100, and then outputs the determination result Q5 to the power adjustment unit 150, such that the power adjustment unit 150 selects the corresponding preset power to reset the power limitation of the system-on chip 110 according to the determination result Q5, thereby enabling the surface temperature of the electronic device 100 to be stably maintained within a range.

The system-on chip 110 may be a Central Processing Unit (CPU) used to perform basic operations, logic operations and system Input/Output operations required for operating the electronic device 100. Accordingly, the comparing unit 130, the determining unit 140, and the power adjustment unit 150 may be fulfilled by using a firmware program with a Central Processing Unit (CPU).

In addition, the electronic device 100 further includes a storage unit 170. The storage unit 170 is used to save a plurality of preset setting statuses of the electronic device 100 and a plurality of preset powers corresponding to the preset setting statuses for the power adjustment unit 150 to select the corresponding preset power according to the determination result Q5 produced by the determining unit 140. Therefore, the power adjustment unit 150 can reset the power limitation of the system-on chip 110 according to the preset power selected from the determination result Q5, such that the surface temperature of the electronic device 100 can be stably maintained within a certain range in response to various setting statuses. Herein, the power limitation refers to a maximum power limitation of the system-on chip 110. The plurality of preset powers refer to the corresponding maximum preset power values by which the surface temperature of the electronic device 100 is maintained within a specific range under various setting statuses.

The storage unit 170 may be volatile memory or non-volatile memory, such as random access memory (RAM), dynamic random access memory (DRAM), static random access memory (SRAM), solid-state hard drive (SSD), read-only memory (ROM), flash memory, and so on.

Figure 3:
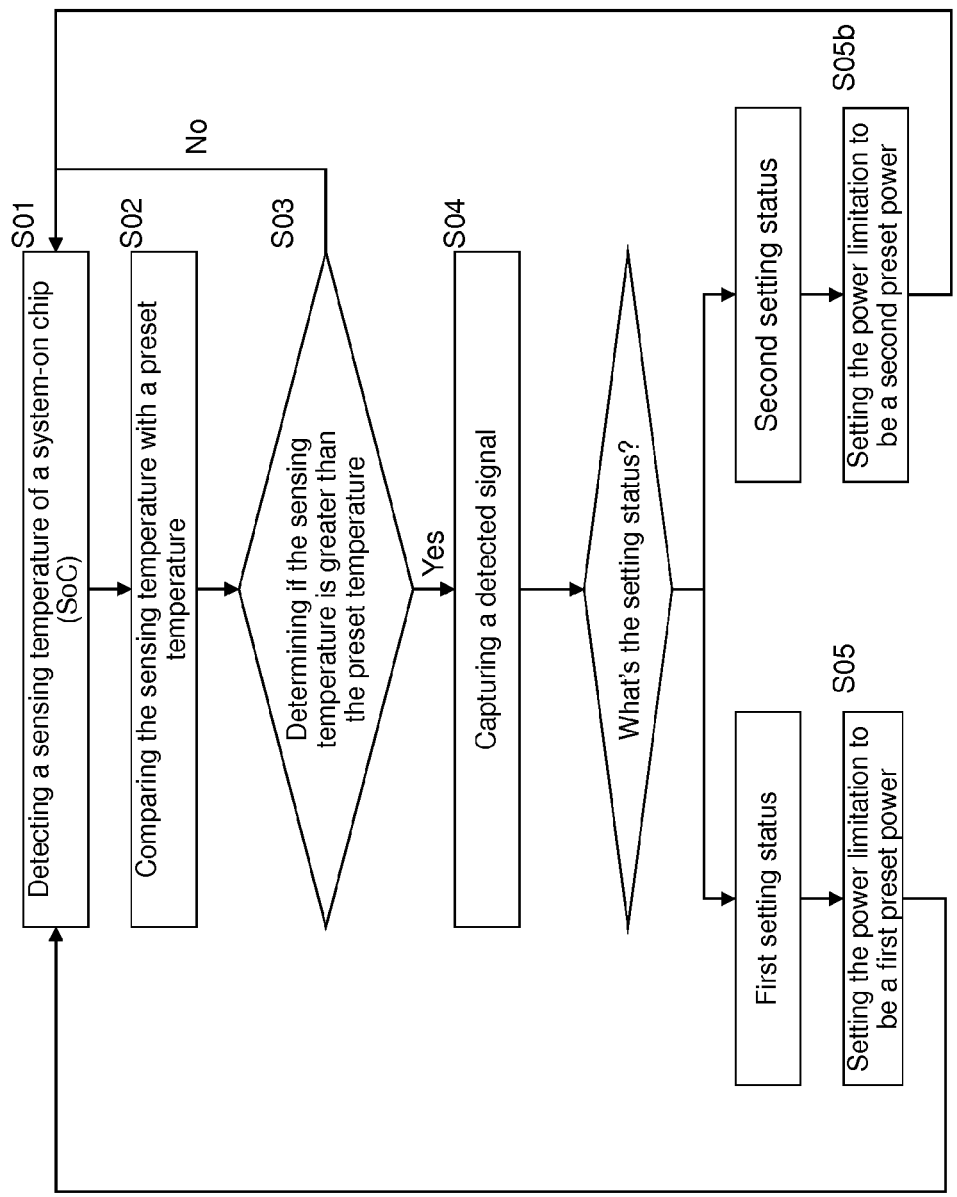
FIG. 3 is a flowchart showing a method for controlling the system power according to the first embodiment of the present invention.

FIG. 3 is a flowchart showing a method for controlling the system power according to the first embodiment of the present invention. Please refer to FIG. 3. The method for controlling the system power includes detecting a sensing temperature of the system-on chip 110 (Step S01), comparing the sensing temperature and the preset temperature (Step S02), determining if the sensing temperature is greater than preset temperature (Step S03), capturing a detected signal Q4 produced by a gravity sensor 160 of the electronic device 100 (Step S04), and lowering the surface temperature of the electronic device 100 by setting the power limitation of the system-on chip 110 to be a first preset power corresponding to a first setting status when the detected signal Q4 indicates that the electronic device 100 is in the first setting status (Step S04a).

In Step S01, the temperature sensor 120 of the electronic device 100 detects a sensing temperature of the system-on chip 110 to capture a value corresponding to the sensing temperature.

In Step S02, the comparing unit 130 of the electronic device 100 compares the sensing temperature and the preset temperature and outputs the comparison result Q3 to the determining unit 140. In Step S03, the electronic device 100 can only enable the determining unit 140 to proceed with subsequent steps of controlling the system power (i.e. Step S04) when the comparison result Q3 output by the comparing unit 130 indicates that the sensing temperature is greater than the preset temperature. Accordingly, Step S03 is an important mechanism to determine whether the subsequent Step S04 and Step S05a or Step S05b is performed.

Accordingly, in Step S03, when the comparison result Q3 output by the comparing unit 130 indicates that the sensing temperature is greater than the preset temperature, this means that under the current setting status of the electronic device 100, the temperature of the system-on chip 110 has exceeded the preset temperature. Therefore, to maintain the surface temperature of the electronic device 100 within the specific range, the electronic device 100 continues to perform Step S04 to adjust the power according to the captured detected signal Q4. Conversely, when the comparison result Q3 output by the comparing unit 130 indicates that the sensing temperature is less than the preset temperature, this means that under the current setting status of the electronic device 100 the temperature of the system-on chip 110 does not exceed the preset temperature. Therefore, the surface temperature of the electronic device 100 is maintained within a preset range, such that the electronic device 100 returns to Step S01 to continue detecting the sensing temperature of the system-on chip 110.

After the electronic device 100 determines that the sensing temperature is greater than the preset temperature in Step S03, the electronic device 100 performs Step S04. In Step S04, the electronic device 100 enables the determining unit 140 to capture the detected signal Q4 produced by the gravity sensor 160 to determine the current setting status of the electronic device 100.

In some embodiments, the gravity sensor 160 is only enabled to detect the current tilted state of the electronic device 100 and generate the corresponding detected signal Q4 when the comparison result Q3 output by the comparing unit 130 indicates that the sensing temperature is greater than the preset temperature. Therefore, the gravity sensor 160 does not need to continuously detect the setting status of the electronic device 100, thereby reducing the energy consumed by the electronic device 100.

In addition, the gravity sensor 160 may be an accelerometer, which calculates the current tilt angle of the electronic device 100 by measuring the force to bear when the speed changes, but the present invention is not limited thereto.

Herein, the detected signal Q4 output by the gravity sensor 160 represents the current tilt angle formed between the electronic device 100 and the horizontal plane 210.

FIG. 4 and FIG. 5 are lateral views respectively showing the electronic device 100 for controlling the system power in a first setting status and in a second setting status according to the first embodiment of the present invention. Please refer to FIG. 4 and FIG. 5. In the present embodiment, the determining unit 140 determines the current setting status of the electronic device 100 by determining if the tilt angle θ formed between the electronic device 100 and the horizontal plane 210 is greater than, less than, or equal to the threshold TH. Specifically, the horizontal plane 210 is a plane (e.g. desktop) in contact with the electronic device 100 when the electronic device 100 is placed horizontally.

Herein, the determining unit 140 uses a threshold TH as a criterion. Thus, the current setting status of the electronic device 100 can at least be divided into two, hereinafter referred to as a first setting status and second setting status. Specifically, the first setting status indicates that the gravity sensor 160 detects that the current setting status of electronic device 100 is in a horizontal state (as shown in FIG. 4). The second setting status indicates that the gravity sensor 160 detects that the current setting status of the electronic device 100 is in a non-horizontal state (as shown in FIG. 5).

Accordingly, when the determining unit 140 determines according to the detected signal Q4 output by the gravity sensor 160 that the electronic device 100 is in the first setting status, this means that the current tilt angle θ formed between the electronic device 100 and the horizontal plane 210 is less than or equal to the threshold TH and represents the horizontally placed state, and then proceed to Step S05a to set the power limitation of the system-on chip 110 to be the first preset power corresponding to the first setting status. When the determining unit 140 determines according to the detected signal Q4 output by the gravity sensor 160 that the electronic device 100 is in the second setting status, this means that the current tilt angle θ formed between the electronic device 100 and the horizontal plane 210 is greater than the threshold TH and represents the non-horizontally placed state, and then proceed to Step S05b to set the power limitation of the system-on chip 110 to be the second preset power corresponding to the second setting status.

In the present embodiment, the threshold TH is substantially set as 0 degree. Thus, as long as the tilt angle θ formed between the electronic device 100 and the horizontal plane detected by the gravity sensor 160 is not 0 degree, the determination result Q5 output by the determining unit 140 indicates that the current setting status of the electronic device 100 is in the second setting status (i.e. non-horizontal state), but the present invention is not limited thereto. The threshold TH may not be 0 degree depending on system settings of the electronic device 100.

In addition, when the electronic device 100 is in the first setting status (i.e. horizontal state), the area where the electronic device 100 is in contact with the horizontal plane 210 is broader and thus heat is not dissipated easily. Accordingly, the cooling capacity of the electronic device 100 in the first setting status is poorer than that of the electronic device 100 in the second setting status (i.e. non-horizontal state). That is, when the electronic device 100 is in the first setting status or in the second setting status, even the power limitation of the system-on chip 110 remains the same, the surface temperature of the electronic device 100 may rise because the heat of the electronic device 100 in the first setting status is not dissipated easily, which easily causes the surface temperature of the electronic device 100 exceed its highest ideal temperature.

Therefore, in response to different cooling capacities, the first preset power corresponding to the first setting status is less than the second preset power corresponding to the second setting status. Therefore, the surface temperature of the electronic device 100 can still be maintained within the preset temperature even when the electronic device 100 is in the first setting status where the heat dissipation is poorer, and the surface temperature of the electronic device 100 in the first setting status is substantially the same as that of the electronic device 100 in the second setting status.

In some embodiments, the amount of the power limitation of the system-on chip 110 has impact on the operating frequency of the system-on chip 110, thereby affecting the performance of the electronic device 100. Therefore, when the electronic device 100 is in the first setting status, due to the poor heat dissipation, the corresponding first preset power is also relatively small, making the power limitation of the system-on chip 110 relatively low and the operating frequency also relatively low. This further reduces the performance of electronic device 100 to make the surface temperature of the electronic device 100 be maintained within the specific range, and prevents the operational efficiency of various electronic components inside the electronic device 100 from being even worse due to high surface temperature when the electronic device 100 is in the first setting status where the heat cannot be dissipated easily. Similarly, when the electronic device 100 is in the second setting status, due to the better heat dissipation, the second preset power is relatively large. It is likely to make the power limitation of the system-on chip 110 relatively increase and the operating frequency relatively high, and thus enhance the performance of the electronic device 100.

Therefore, when the comparison result Q3 output by the comparing unit 130 indicates that the sensing temperature is greater than the preset temperature and after the determining unit 140 determines the current setting status of the electronic device 100, the power adjustment unit 150 performs any of Step S05a or Step S05b according to the determination result Q5 output by the determining unit 140 to correspondingly set the power limitation of the system-on chip 110 and lower the overall surface temperature of the electronic device 100, thereby keeping the surface temperature of the electronic device 100 within a certain range. After setting the power limitation of the system-on chip 110 is completed, the electronic device 100 returns to Step S01 to continuously monitor the sensing temperature of the system-on chip 110 to avoid the excessively high surface temperature of the electronic device 100.

The following is described as an example in case that the initial power limitation of the system-on chip 110 in the electronic device 100 is the second preset power corresponding to the second setting status, and assuming the current setting status of the electronic device 100 is changed from the second setting status corresponding to the second preset power (i.e. non-horizontal state) to the first setting status (i.e. horizontal state).

As previously described, when the electronic device 100 is changed from the second setting status to the first setting status, heat of the overall cannot be dissipated easily due to a substantial reduction of the heat dissipation area. Since the current power limitation of the system-on chip 110 in the electronic device 100 is kept as the second preset power corresponding to the second setting status (the second preset power is greater than the first preset power), it is increasingly likely to cause a gradual increase in the surface temperature of the electronic device 100. In the present embodiment, since the temperature sensor 120 of the electronic device 100 continuously detects the temperature of the system-on chip 110 and then sends the sensing temperature to the comparing unit 130 of the electronic device 100 for comparison, when the comparing unit 130 determines that the sensing temperature is greater than the preset temperature, the electronic device 100 can enable the determining unit 140 according to the detected signal Q4 produced by the gravity sensor 160 to determine that the current tilt angle θ formed between the electronic device 100 and the horizontal plane 210 is less than the threshold TH and correspondingly set the power limitation of the system-on chip 110 to be the first preset power. Therefore, the power adjustment unit 150 of the electronic device 100 can reset the power limitation of the system-on chip 110 to be the first preset power according to the determination result Q5 to lower the surface temperature of the electronic device 100, thereby keeping the surface temperature of the electronic device 100 within a certain range.

Figure 6:
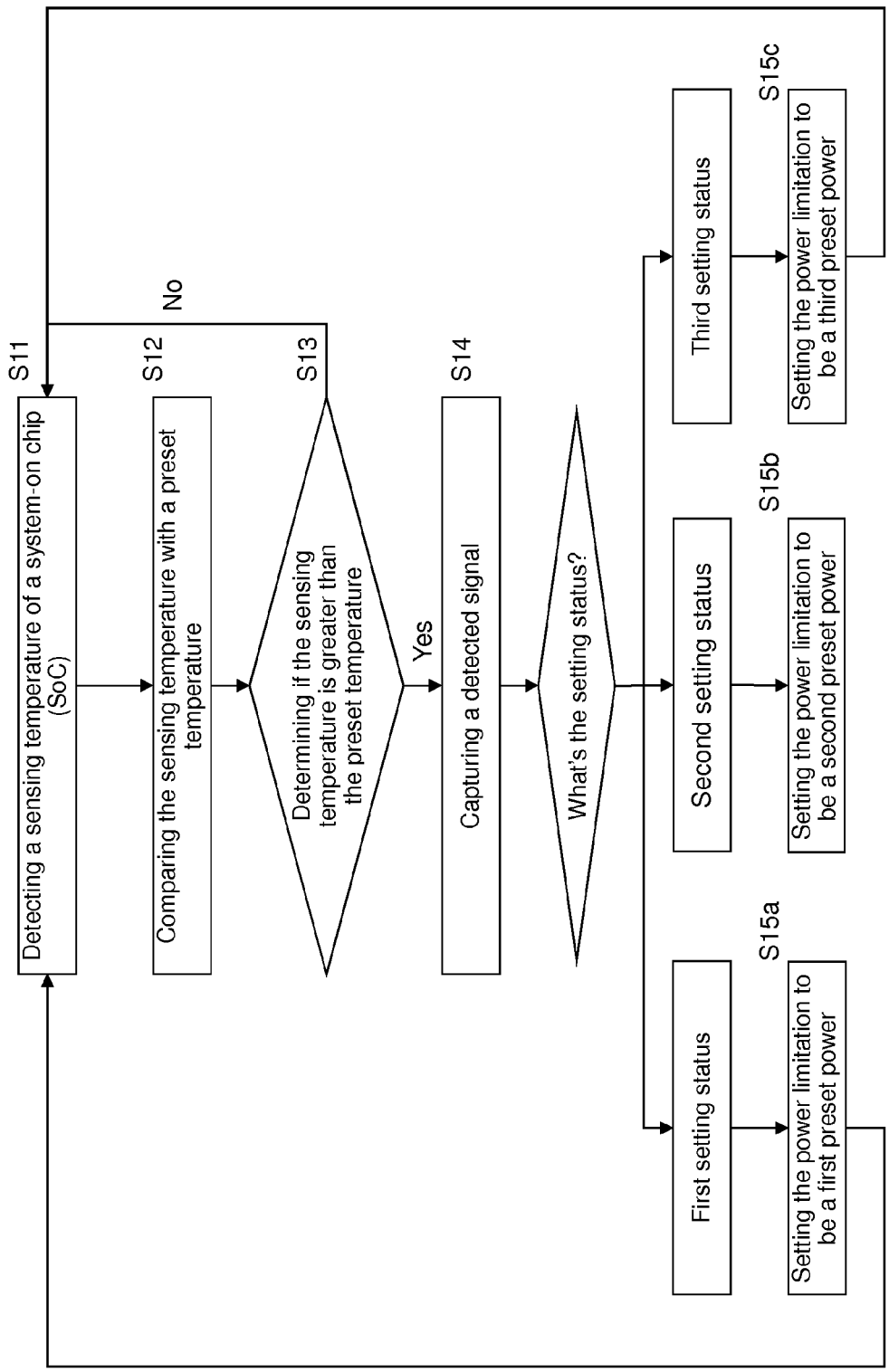
FIG. 6 is a flowchart showing a method for controlling the system power according to a second embodiment of the present invention.

FIG. 6 is a flowchart showing a method for controlling the system power according to a second embodiment of the present invention. Please refer to FIG. 6. The method for controlling the system power includes detecting a sensing temperature of the system-on chip 110 (Step S11), comparing the sensing temperature and the preset temperature (Step S12), determining if the sensing temperature is greater than the preset temperature (Step S13), capturing a detected signal Q4 produced by a gravity sensor 160 of an electronic device 100 (Step S14), and lowering the surface temperature of the electronic device 100 by setting the power limitation of the system-on chip 110 to be a first preset power corresponding to a first setting status when the detected signal Q4 indicates that the electronic device 100 is in the first setting status (Step S15a).

In the present invention, the Step S11 to Step S13 in the second embodiment and the Step S01 to Step S03 in the first embodiment described above are substantially the same, and thus they will not be repeated hereinafter.

Figure 9:
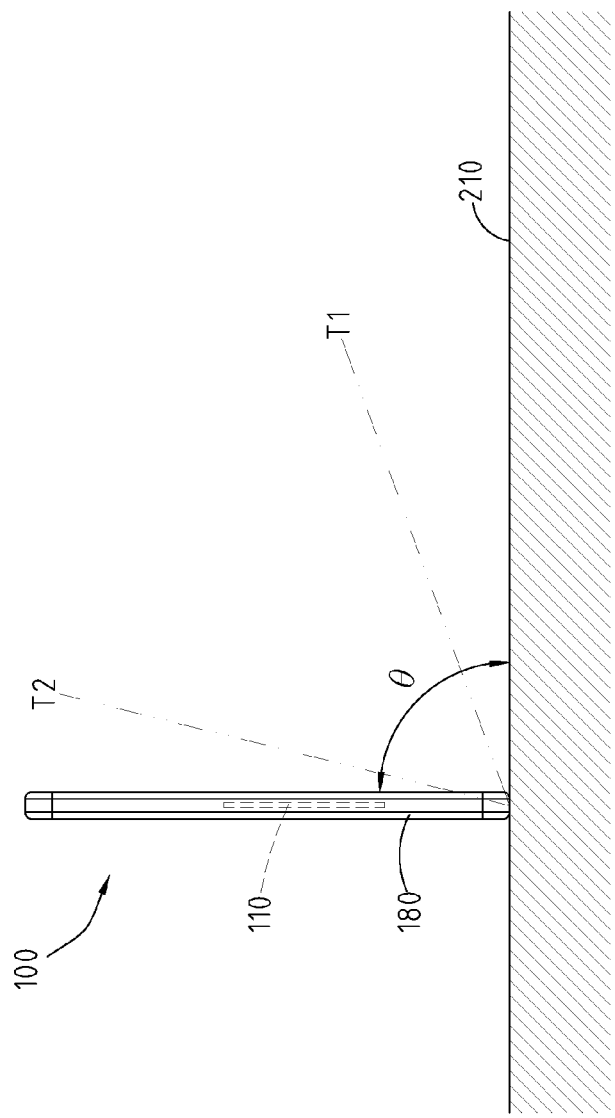
FIG. 9 is a lateral view showing the electronic device for controlling the system power in the second setting status according to the second embodiment of the present invention.

FIG. 7 to FIG. 9 are the lateral views respectively showing the electronic device 100 for controlling the system power in a first setting status, in a third setting status, and in a second setting status according to the second embodiment of the present invention. Please refer to FIG. 7 to FIG. 9. After the electronic device 100 determines that the sensing temperature is greater than the preset temperature in Step S13, the electronic device 100 then performs Step S14 to enable the determining unit 140 to capture the detected signal Q4 produced by the gravity sensor 160 and determine the current setting status of the electronic device 100. In the present embodiment, the determining unit 140 determines the current setting status of the electronic device 100 not only according to whether the tilt angle θ formed between the electronic device 100 and the horizontal plane 210 is less than or equal to the first threshold T1, but also determines and distinguishes the current setting status of the electronic device 100 according to a second threshold T2 that whether the tilt angle θ formed between the electronic device 100 and the horizontal plane 210 is greater than or equal to the second threshold T2 or is between the first threshold T1 and the second threshold T2 to enable the surface temperature of the electronic device 100 to be maintained within a specific range under the setting statuses. Here, only two thresholds (i.e. the first threshold T1 and the second threshold T2) are used to determine the current setting status of the electronic device 100, but the present invention is not limited thereto.

In the present embodiment, the determining unit 140 uses two thresholds as criteria, and thus the current setting status of the electronic device 100 can be at least divided into three, hereinafter referred to as a first setting status, a second setting status, and a third setting status. Specifically, the first setting status indicates that the gravity sensor 160 detects the tilt angle θ formed between the electronic device 100 and the horizontal plane 210 is less than or equal to first threshold T1. That is, the current setting status of the electronic device 100 detected by the gravity sensor 160 substantially represents the horizontal state (as shown in FIG. 7). The second setting status indicates that the tilt angle θ formed between the electronic device 100 and the horizontal plane 210 detected by the gravity sensor 160 is greater than or equal to the second threshold T2. That is, the current setting status of the electronic device 100 detected by the gravity sensor 160 substantially represents an upright state (as shown in FIG. 9). The third setting status indicates that the tilt angle θ formed between the electronic device 100 and the horizontal plane 210 detected by the gravity sensor 160 is between the first threshold T1 and the second threshold T2. That is, the current setting status of the electronic device 100 detected by the gravity sensor 160 substantially represents a tilted state (as shown in FIG. 8).

Accordingly, if the determining unit 140 determines according to the detected signal Q4 output by the gravity sensor 160 that the electronic device 100 is in the first setting status, this means that the current tilt angle θ formed between the electronic device 100 and the horizontal plane 210 is less than or equal to first threshold T1 and represents an almost horizontally placed state, and this proceed to Step S15a to set the power limitation of the system-on chip 110 to be the first preset power corresponding to the first setting status. If the determining unit 140 determines according to the detected signal Q4 output by the gravity sensor 160 that the electronic device 100 is in the second setting status, this means that the current tilt angle θ formed between the electronic device 100 and the horizontal plane 210 is greater than the second threshold T2 and represents an almost upright placed state, and then proceed to Step S15b to set the power limitation of the system-on chip 110 to be the second preset power corresponding to the second setting status. If the determining unit 140 determines according to the detected signal Q4 detected by the gravity sensor 160 that the electronic device 100 is in the third setting status, this means that the current tilt angle θ formed between the electronic device 100 and the horizontal plane 210 is between the first threshold T1 and the second threshold T2 and represents a tilt placed state, and then proceed to Step S15c to set the power limitation of the system-on chip 110 to be the third preset power corresponding to the third setting status.

In the present embodiment, the second threshold T2 may be 45 or 60 degrees, but the present invention is not limited thereto. Also, the first threshold T1 is less than the second threshold T2 and the first threshold T1 is substantially set as 0 degree. Therefore, only when the gravity sensor 160 detects that the tilt angle θ formed between the electronic device 100 and the horizontal plane is 0 degree, the determining unit 140 determines the current setting status of the electronic device 100 is the first setting status (i.e. horizontal state). However, the first threshold T1 may not be 0 degree and may be less than the second threshold T2, depending on system settings of the electronic device 100.

When the electronic device 100 is in the third setting status (i.e. tilted state), the distance between the electronic device 100 and the horizontal plane 210 is shorter than the distance of the electronic device 100 in the second setting status (i.e. upright state), and a lid effect may be generated. Consequently, the heat dissipation of the electronic device 100 in the third setting status is poorer than that of the electronic device 100 in the second setting status, but better than that in the first setting status. Therefore, in response to different heat dissipation capacities, the first preset power corresponding to the first setting status is less than the second preset power corresponding to the second setting status and the third preset power is between the first preset power and the second preset power, such that the surface temperature of the electronic device 100 can be maintained within a specific range even under the setting status with different heat dissipation capacities.

Accordingly, when the comparison result Q3 output by the comparing unit 130 indicates that the sensing temperature is greater than the preset temperature and after the determining unit 140 determines the current setting status of the electronic device 100, the power adjustment unit 150 can perform any of Step S15*a*, Step S15*b* or Step S15*c* according to the determination result Q5 from the determining unit 140 to correspondingly set the power limitation of the system-on chip 110 and reduce the overall surface temperature of the electronic device 100.

As described above, the method for controlling the system power and the electronic device for controlling the system power according to the present invention detects the current setting status of the electronic device through the gravity sensor (G-Sensor) of the electronic device, such that the electronic device can enable the power limitation of the system-on chip to correspond to a specific preset power in accordance with a different setting status according to a detected signal produced by the gravity sensor. Thus, the output power of the electronic device can be most effectively used with a different setting status, and the surface temperature of the electronic device can be maintained within a specific range.

The technical content of the present invention has been disclosed with reference to preferred embodiments described above, but it is not intended to limit the present invention. Certain changes and modifications made by those skilled in the art, without departing from the spirit of the invention, shall be encompassed within the scope of the invention. Therefore, the scope of the present invention shall be subject to what has been defined by the appended claims.

What is claimed is:

1. A method for controlling the system power, which is applied in an electronic device, the method comprising:
    detecting a sensing temperature of a system-on chip of the electronic device;
    comparing the sensing temperature with a preset temperature;
    capturing a detected signal produced by a gravity sensor of the electronic device when determining the sensing temperature is greater than the preset temperature; and
    lowering the surface temperature of the electronic device by setting the power limitation of the system-on chip to be a first preset power corresponding to a first setting status when the detected signal indicates that the electronic device is in the first setting status.

2. The method for controlling the system power as claimed in claim 1, further comprising:
    enabling the power limitation of the system-on chip to be a second preset power corresponding to a second setting status when the sensing temperature is greater than the preset temperature and the detected signal indicates that the electronic device is in the second setting status, wherein the second preset power is greater than the first preset power.

3. The method for controlling the system power as claimed in claim 2, wherein the first setting status represents a horizontal state detected by the gravity sensor, and the second setting status represents a non-horizontal state detected by the gravity sensor.

4. The method for controlling the system power as claimed in claim 2, wherein the first setting status is a state where the gravity sensor detects that a tilt angle formed between the electronic device and a horizontal plane is less than or equal to a threshold, and the second setting status is a state where the gravity sensor detects that the tilt angle formed between the electronic device and the horizontal plane is greater than the threshold, wherein the power limitation of the system-on chip is lowered to be the first preset power when the tilt angle is less than the threshold.

5. The method for controlling the system power as claimed in claim 1, wherein the power limitation of the system-on chip is originally set to the second preset power which is greater than the first preset power, and the step of setting the power limitation is resetting the power limitation of the system-on chip according to the first preset power corresponding to the first setting status.

6. The method for controlling the system power as claimed in claim 5, further comprising:
    setting the power limitation of the system-on chip to be a second preset power corresponding to a second setting status when the sensing temperature is greater than the preset temperature and the detected signal indicates that the electronic device is in a second setting status; and
    lowering the surface temperature of the electronic device by resetting the power limitation of the system-on chip according to a third preset power corresponding to the third setting status when the sensing temperature is greater than the preset temperature and the detected signal indicates that the electronic device is in the third setting status, wherein the third preset power is set between the second preset power and the first preset power.

7. The method for controlling the system power as claimed in claim 6, wherein the first setting status represents a horizontal state detected by the gravity sensor, the second setting status represents an upright state detected by the gravity sensor, and the third setting status represents a tilted state detected by the gravity sensor.

8. The method for controlling the system power as claimed in claim 6, wherein the first setting status is the state where the gravity sensor detects that a tilt angle formed between the electronic device and a horizontal plane is less than or equal to a first threshold, and the second setting status is the state where the gravity sensor detects that the tilt angle formed between the electronic device and the horizontal plane is greater than or equal to a second threshold, and the third setting status is the state where the gravity sensor detects that the tilt angle formed between the electronic device and the horizontal plane is between the first threshold and the second threshold, wherein the first threshold is less than the second threshold.

9. The method for controlling the system power as claimed in claim 8, wherein the first threshold is not zero.

10. The method for controlling the system power as claimed in claim 8, wherein the first threshold is zero.

11. The method for controlling the system power as claimed in claim 1, wherein in the case, the gravity sensor is enabled to detect the current tilted state of the electronic device and generate the corresponding detected signal when the sensing temperature is greater than the preset temperature.

12. An electronic device for controlling the system power, comprising:

a system-on chip (SoC), which is disposed within a shell of the electronic device;

a temperature sensor, which is used to detect a sensing temperature of the system-on chip;

a comparing unit, which is used to compare the sensing temperature with a preset temperature;

a determining unit, which is used to capture a detected signal produced by a gravity sensor of the electronic device when determining the sensing temperature is greater than the preset temperature; and a power adjustment unit, which is used to lower the surface temperature of the electronic device by setting a power limitation of the system-on chip to be a first preset power corresponding to a first setting status when the sensing temperature is greater than the preset temperature and the detected signal indicates that the electronic device is in the first setting status.

13. The electronic device for controlling the system power as claimed in claim 12, further comprising:

a storage unit, which saves a plurality of preset setting statuses corresponding to a plurality of preset powers, wherein the plurality of preset setting statuses comprising the first setting status and a second setting status, and the plurality of preset powers comprising the first preset power corresponding to the first setting status and a second preset power corresponding to the second setting status, where the second preset power being greater than the first preset power.

14. The electronic device for controlling the system power as claimed in claim 13, wherein the power adjustment unit lowers the power limitation of the system-on chip from the second preset power to the first preset power to lower the surface temperature of the electronic device in the case the power limitation of the system-on chip is set as the second preset power originally, and the sensing temperature is greater than the preset temperature and the detected signal indicates that the electronic device is in the first setting status.

15. The electronic device for controlling the system power as claimed in claim 13, wherein the first setting status represents a horizontal state detected by the gravity sensor, and the second setting status represents a non-horizontal state detected by the gravity sensor.

16. The electronic device for controlling the system power as claimed in claim 13, wherein the first setting status is the state where the gravity sensor detects that a tilt angle formed between the electronic device and a horizontal plane is less than or equal to a threshold, and the second setting status is the state where the gravity sensor detects that the tilt angle formed between the electronic device and a horizontal plane is greater than the threshold, wherein the power limitation of the system-on chip is lowered to be the first preset power when the tilt angle is less than the threshold.

17. The electronic device for controlling the system power as claimed in claim 13, wherein the preset setting status further comprises a third setting status, and the plurality of the preset powers further comprise a third preset power corresponding to the third setting status, and the third preset power is between the first preset power and the second preset power.

18. The electronic device for controlling the system power as claimed in claim 17, wherein the first setting status represents a horizontal state detected by the gravity sensor, the second setting status represents an upright state detected by the gravity sensor, and the third setting status represents a tilted state detected by the gravity sensor.

19. The electronic device for controlling the system power as claimed in claim 18, wherein the power adjustment unit lowers the power limitation of the system-on chip from the second preset power to the third preset power to lower the surface temperature of the electronic device in the case the power limitation of the system-on chip is set as the second preset power originally, and the sensing temperature is greater than the preset temperature and the detected signal indicates that the electronic device is in the third setting status.

20. The electronic device for controlling the system power as claimed in claim 17, wherein the first setting status is the state where the gravity sensor detects that a tilt angle formed between the electronic device and a horizontal plane is less than or equal to a first threshold, and the second setting status is the state where the gravity sensor detects that the tilt angle formed between the electronic device and the horizontal plane is greater than or equal to a second threshold, and the third setting status is the state where the gravity sensor detects that the tilt angle formed between the electronic device and the horizontal plane is between the first threshold and the second threshold, wherein the first threshold is less than the second threshold.

\* \* \* \* \*